Jan. 6, 1970  R. L. LAMBERTS ET AL  3,488,124
READOUT OF A DIFFRACTION GRATING PATTERN BY ACHROMATIZING
THE DIFFRACTION SPECTRA INTO LINES OF POLYCHROMATIC LIGHT
Filed Oct. 9, 1967

ROBERT L. LAMBERTS
WILLIAM F. GARBE
INVENTORS

BY *Morton A. Polster*

ATTORNEY

United States Patent Office 3,488,124
Patented Jan. 6, 1970

3,488,124
READOUT OF A DIFFRACTION GRATING PATTERN BY ACHROMATIZING THE DIFFRACTION SPECTRA INTO LINES OF POLYCHROMATIC LIGHT
Robert L. Lamberts and William F. Garbe, Rochester, N.Y., assignors to Eastman Kodak Company, Rochester, N.Y., a corporation of New Jersey
Filed Oct. 9, 1967, Ser. No. 673,808
Int. Cl. G06k 9/08
U.S. Cl. 356—71                       5 Claims

ABSTRACT OF THE DISCLOSURE

Method and apparatus for reading-out information stored in a discrete area of a recording medium in the form of diffraction grating patterns. A beam of unfiltered, polychromatic light is directed at the discrete area so that it is diffracted by each pattern present in the area into a corresponding diffraction spectrum. Each such spectrum is directed through light-deflecting means (e.g., a prism) positioned to disperse rays in an orientation generally opposite to the displacement of the rays in said spectrum, thereby achromatizing said spectrum into a respective first-order diffraction line which is imaged at a position predetermined by the individually distinct spatial frequency of its corresponding grating pattern.

BACKGROUND OF THE INVENTION

This invention relates to optical diffraction gratings, and more particularly to information storage and retrieval systems in which digital data is stored on a record medium in the form of a plurality of superimposed diffraction grating patterns.

Although the recording of binary information on photographic film in the form of light and dark portions indicative of binary bits has been well known for some time, such recording systems have never been very satisfactory due to the difficulty of maintaining proper alignment of the film in read-out apparatus, and also due to the more serious problem of loss of information resulting from dirt, dust and/or imperfections in the film medium itself. Recently, however, in U.S. Patent 3,312,-955, issued Apr. 4, 1967, R. L. Lamberts and G. C. Higgins disclosed a novel information storage and retrieval system which overcomes the dirt and alignment problems that have normally plagued film storage systems. According to the Lamberts and Higgins system, binary information is recorded on film in the form of a composite diffraction grating comprising a plurality of superimposed line patterns of individually-unique frequencies, each different grating pattern corresponding to a particular binary bit. When monochromatic light is directed through the superimposed grating patterns, a strong first-order diffraction line appears for each unique line pattern included in the composite grating. For instance, a 7-digit binary numeral is recorded in the form of 1 to 7 superimposed diffraction gratings, the presence or absence of a particular line grating resulting in the presence or absence of its corresponding first-order diffraction line during read-out and being indicative of the "1" or "0" value of its corresponding binary bit. Since each of the individual line patterns appears throughout the entire composite grating area (i.e., since each segment of the superimposed grating area carries the information relating to all seven bits), read-out apparatus tolerances are greatly increased, and dirt problems are minimized.

Prior to the invention herein, read-out was accomplished in the Lamberts and Higgins system by utilizing coherent light produced by lasers or monochromatic light provided by appropriately filtered conventional light sources. While the laser is very effective for this application, it is quite expensive, particularly when compared to a conventional light source. On the other hand, in order to provide relatively sharp first-order diffraction lines, a conventional light source must be narrowely filtered and masked, and this results in such great light losses that expensive means of amplification are required before the absence or presence of the first-order lines can be adequately monitored by conventional photodetection means.

SUMMARY OF THE INVENTION

While the diffraction grating read-out apparatus disclosed herein is extremely simple and uses an inexpensive conventional light source, it provides relatively startling results, namely: By a simple modification of prior art apparatus, and without requiring any expensive amplification means, the disclosed system provides output signals of a magnitude as much as 200 times greater than the output signals produced by unmodified prior art apparatus using a similar conventional light source.

According to the method disclosed herein, a conventional light source is appropriately masked to provide a narrow beam of polychromatic (e.g., white) light which is directed at the record medium. The superimposed diffraction gratings on the record medium break up this beam into a plurality of diffraction spectra which, in turn, are directed through a light-deflecting medium, such as a prism. The prism is positioned so that rays deflected by it will be dispersed in an orientation generally opposite to the orientation of the ray dispersion appearing in the diffraction spectra. Because of this opposite orientation, the prism achromatizes the spectra into a plurality of respective first-order diffraction lines of the polychromatic light, a relatively distinct first-order line being produced for each particular diffraction grating in the original record. Finally, the diffraction lines are monitored by a plurality of photocells, each photocell indicating the presence or absence of a particular first-order diffraction line.

It will be appreciated from the following detailed description that the invention disclosed herein provides an efficient, practical and quite inexpensive method and apparatus for reading out information stored in the form of a plurality of superimposed diffraction gratings. Further, this invention provides such read-out apparatus using an inexpensive, conventional polychromatic light source.

The objects, advantages and characteristics features of the subject invention will be in part obvious from the accompanying drawings, and in part pointed out in the following detailed description of the invention in which reference will be made to the accompanying drawings wherein like reference numerals designate corresponding parts, and wherein.

Figure 1:
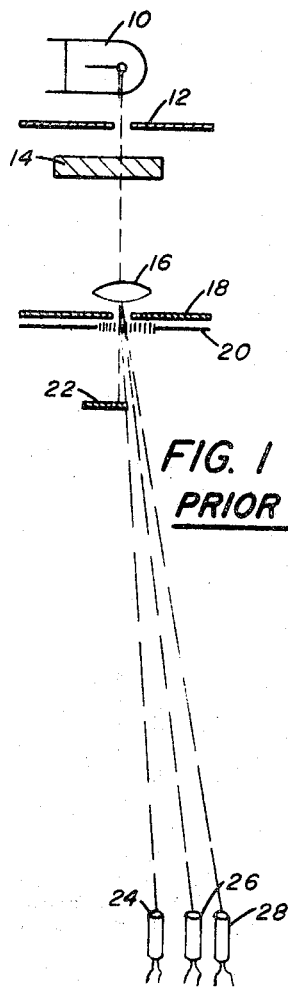
FIG. 1 is a schematic diagram of prior art apparatus using a conventional light source for reading-out data stored in the form of a superimposed diffraction grating patterns.

Referring now to the prior art arrangement illustrated schematically in FIG. 1, a beam of light from lamp 10 passes through stray light mask 12, and filter 14, being directed by a lens system 16 through an appropriate aperture plate 18 onto record medium 20. As explained above, digital data has been stored on record medium 20 in the form of a plurality of superimposed diffraction gratings of individually distinct spatial frequency. Filter 14 passes only monochromatic light of relatively narrow band width, and this monochromatic light is diffracted by the various grating patterns present on film record medium 20 to form a plurailty of first-order diffraction lines corresponding to the grating patterns present, the zero-order light (i.e., the major portion of the beam which passes directly through the grating patterns without being diffracted) being preferably blocked by a zero-order mask 22.

A plurality of photodetectors 24, 26, and 28 are positioned so that they will be impinged by the first-order diffraction lines formed by the respective grating patterns present on record medium 20. It will be appreciated by those knowledgeable in this art that the position of the photodetectors is determined by the spatial frequencies of the diffraction gratings used to record data on medium 20, the greater the number of lines per millimeter in a respective pattern, the greater the angular deflection of its first-order line. For instance, it can be assumed that detectors 24, 26 and 28 are positioned in the path of the first-order diffraction lines formed by grating patterns of 33 lines per millimeter, 44 lines per millimeter, and 55 lines per millimeter, respectively.

Figure 2:
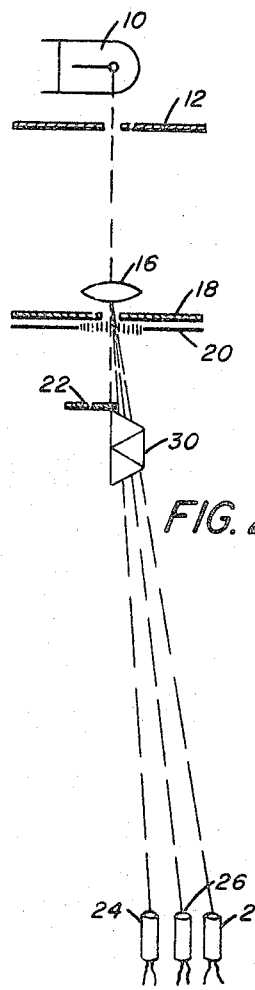
FIG. 2 is a schematic diagram of the apparatus of FIG. 1 modified according to the invention herein.

The essentially simple nature of the invention herein can be fully appreciated by comparing the apparatus schematically depicted in FIG. 2 with the prior art apparatus of FIG. 1 which has just been described above. It is easily noted that the only difference between the prior art and the invention herein is that, in the latter, filter 14 has been removed and a direct-vision prism 30 has been added in the path of the diffracted light. While this change is remarkably simple, it effectively changes the entire character of the read-out light and produces startling results which will be described below.

First of all, because of the lack of any narrow band filter in the light path of the novel apparatus shown in FIG. 2, the read-out beam is polychromatic. Therefore, when this beam is diffracted by the grating patterns appearing on record medium 20, instead of forming a plurality of first-order diffraction lines, the polychromatic light is broken into a plurality of diffraction spectra containing all of the color components of the light emanating from the lamp 10. Prim 30 is positioned in the path of these diffraction spectra so that its spectral dispersion of rays passing through it is oriented in the opposite direction to the orientation of the spectral dispersion caused by the diffraction grating patterns, and therefore prism 30 achromatizes the diffraction spectra, concentrating these spectral bands into relatively narrow lines of polychromatic light.

Special attention is called to the fact that the prism does not achieve perfect achromization of the diffraction spectra, simply because the dispersion characteristics of the prism are not linear, while the dispersal effects of the gratings are linear. Therefore, it is necessary to select a prism having a dispersion approximately equal and opposite to that of a grating of the median spatial frequency used for recording purposes. Although perfect achromization cannot be achieved in this manner, excellent results can be obtained with careful matching of dispersion characteristics, particularly in the spectral region to which the photodetectors are most sensitive. It should be apparent that since the grating dispersion increases with spatial frequency of the grating, when using a prism, as shown in FIG. 2, optimum achromization can be achieved for only a single spatial frequency. Nonetheless, over the range of frequencies normally used for recording, the resulting slight loss in sharpness of the respective first-order lines formed by gratings having spatial frequencies greater or less than the median grating pattern, is not serious.

By using the novel optical system just described, a startling improvement over the prior art is achieved. By avoiding the use of filters to limit the spectral band width of the read-out light, tremendous light losses are avoided. Although a very slight loss is introduced by the use of prism 30, the novel system disclosed in FIG. 2 recombines the dispersed polychromatic light of lamp 10 into first-order diffraction lines containing approximately 40 times the energy of the lines produced by the prior art system shown in FIG. 1, and this great increase in illumination is even further enhanced because it results in a more efficient use of the photodetectors.

Figure 3:
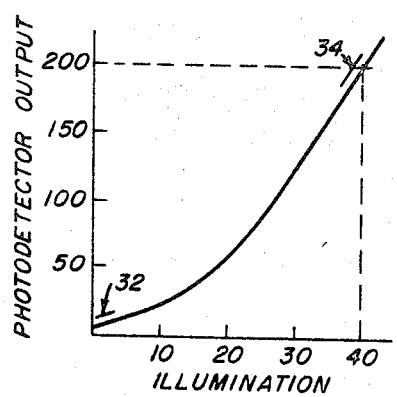
FIG. 3 is the response curve of a conventional photodetection device.

FIG. 3 depicts, in simplified graphic form, a non-linear curve that exemplifies the response characteristics of a conventional photodetector (the illumination and output units being given arbitrary values to facilitate understanding), and it can be appreciated therefrom that, as is well known, conventional photodetectors provide very little output at extremely low levels of illumination. Due to the great light losses sustained by use of narrow band filter 14, the prior art system disclosed in FIG. 1 produces very weak first-order diffraction lines which fall well down into the lowest toe region 32 of the curve. On the other hand, the much stronger illumination from the first-order lines produced by the novel system shown in FIG. 2 falls in the high gain region 34 of the response curve. Therefore, it can be appreciated that the nonlinearity of the detector response combines in effect with the tremendous increase in illumination provided by the novel system illustrated in FIG. 2 to produce a relative output which is quite astounding.

Figure 4:
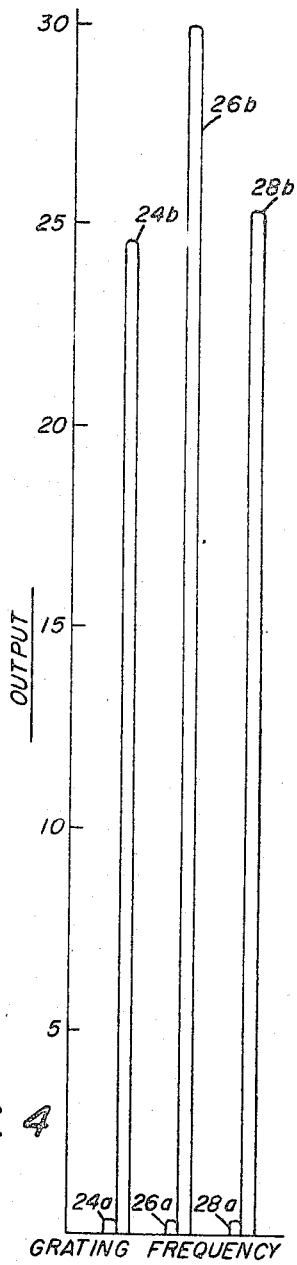
FIG. 4 is a graphic comparison of the output of the prior art system disclosed in FIG. 1 with the output of the same system revised in accordance to the invention herein, as shown in FIG. 2.

The differences in these systems can best be appreciated from FIG. 4 which shows comparison curves of photodetector outputs recorded for three different diffraction grating patterns. Curves 24a, 26a and 28a correspond to the output of photodetectors 24, 26 and 28 when used in the prior art system shown in FIG. 21. That is, when a beam of light from lamp 10 is passed through filter 14 and used to read-out three different superimposed diffraction gratings recorded on film medium 20, the beam is broken into three separate first-order diffraction lines which are detected by detectors 24, 26 and 28 to produce the outputs 24a, 26a and 28a in FIG. 4. However, when the same three superimposed grating patterns on record medium 20 are read out with light supplied by the same lamp 10 and monitored by the same photodetectors 24, 26 and 28, but with the apparatus altered in accordance with the invention herein (i.e., as illustrated in FIG. 2), the output of the respective photocells is shown by curves 24b, 26b and 28b, respectively.

For the reasons given above, the dispersion characteristics of prism 30 are matched to provide optimum achromatization of the spectrum produced by the grating being monitored by photodetector 26. Therefore, as expected, output 26b corresponding to the matched median grating, if of greater magnitude than outputs 24b and 28b, corresponding to diffraction grating patterns having spatial frequencies less and greater than the median spatial frequency. However, it can be seen that these variations are relatively minor when compared to the extremely large gain in overall output achieved by the invention herein.

Thus, the system shown in FIG. 2, while using the same light source and the same photodetectors, produces an electral output of about 200 times greater magnitude than that produced by the prior art system shown in FIG. 1. Of this increase, a factor of 5 is due to detector nonlinearity, as can be seen from FIG. 3. However, the greatest portion of this gain stems from the fact that the system shown in FIG. 2, although using the same light source, provides first-order lines up to 40 times brighter than the first-order lines produced in the prior art device.

While the invention has been shown and described using a direct-vision prism, other optical means for providing the desired reversal of ray dispersion would be equally appropriate. For instance, a simple prism would work as well but would bend the optical axis about 45°. Also, it can be appreciated that optimum achromatization of the diffraction spectra would be achieved for all spatial grating frequencies if they could be passed through an element whose dispersion increases proportional to the distance from its axis. In principle, it should be possible to introduce such appropriately variable dispersion with a specally designed multi-element cylindrical lens.

The invention has been described in detail with particular reference to a preferred embodiment thereof, but it will be understood that variations and modifications can be effected within the spirit and scope of the invention.

What is claimed is:

1. The method of reading-out, at a predetermined monitoring location, information stored in a discrete area of a recording medium in the form of a diffraction grating pattern, comprising the steps of:

directing a beam of polychromatic light at said discrete area so that the beam is diffracted by said pattern to form at least one diffraction spectrum having rays dispersed in a first orientation;

directing said spectrum through light-deflecting means positioned to disperse light rays in an orientation generally opposite to said first orientation, to achromatize said spectrum substantially into a first-order diffraction line of said polychromatic light at said monitoring location.

2. The method of reading-out information stored in a discrete area of a recording medium in the form of a plurality of superimposed diffraction patterns of individually distinct spatial frequencies, comprising the steps of:

directing a beam of polychromatic light at said discrete area to diffract the beam into a plurality of diffraction spectra corresponding to each said superimposed pattern, said spectra having rays dispersed in a first orientation, directing said spectra through light-deflecting means positioned to disperse light rays in an orientation generally opposite to said first orientation, said spectra being thereby substantially achromatized into a plurality of corresponding first-order diffraction lines of said polychromatic light at a plurality of locations corresponding to respective ones of said diffraction patterns; and monitoring said locations for the presence of said lines.

3. Apparatus for reading-out information stored in a discrete area of a recording medium in the form of a diffraction pattern, comprising:

a source of polychromatic light;

means for directing a beam of said light at said discrete area so that the beam is diffracted by said pattern to form a corresponding first-order diffraction spectrum having rays dispersed in a first orientation;

light-deflecting means for dispersing rays in an orientation generally opposite to said first orientation and positioned in the path of said spetcrum to achromatize said spectrum into a first-order diffraction line of said light; and monitoring means selectively responsive to the presence of said first-order line.

4. The apparatus according to claim 3 wherein said light-deflecting means comprises a prism.

5. The apparatus according to claim 4 wherein said prism is a direct-vision prism.

References Cited

UNITED STATES PATENTS

| | | |
|---|---|---|
| 3,052,154 | 9/1962 | Bolz. |
| 3,312,955 | 4/1967 | Lamberts et al. |
| 3,390,257 | 6/1968 | Lohmann. |
| 3,398,269 | 8/1968 | Williams. |
| 3,342,238 | 3/1969 | Girard. |
| 3,432,241 | 3/1969 | Girard. |

RONALD L. WIBERT, Primary Examiner

WARREN A. SKLAR, Assistant Examiner

U.S. Cl. X.R.

350—162